(No Model.)
J. A. KENDALL.
MEASURING FAUCET.
No. 419,778. Patented Jan. 21, 1890.
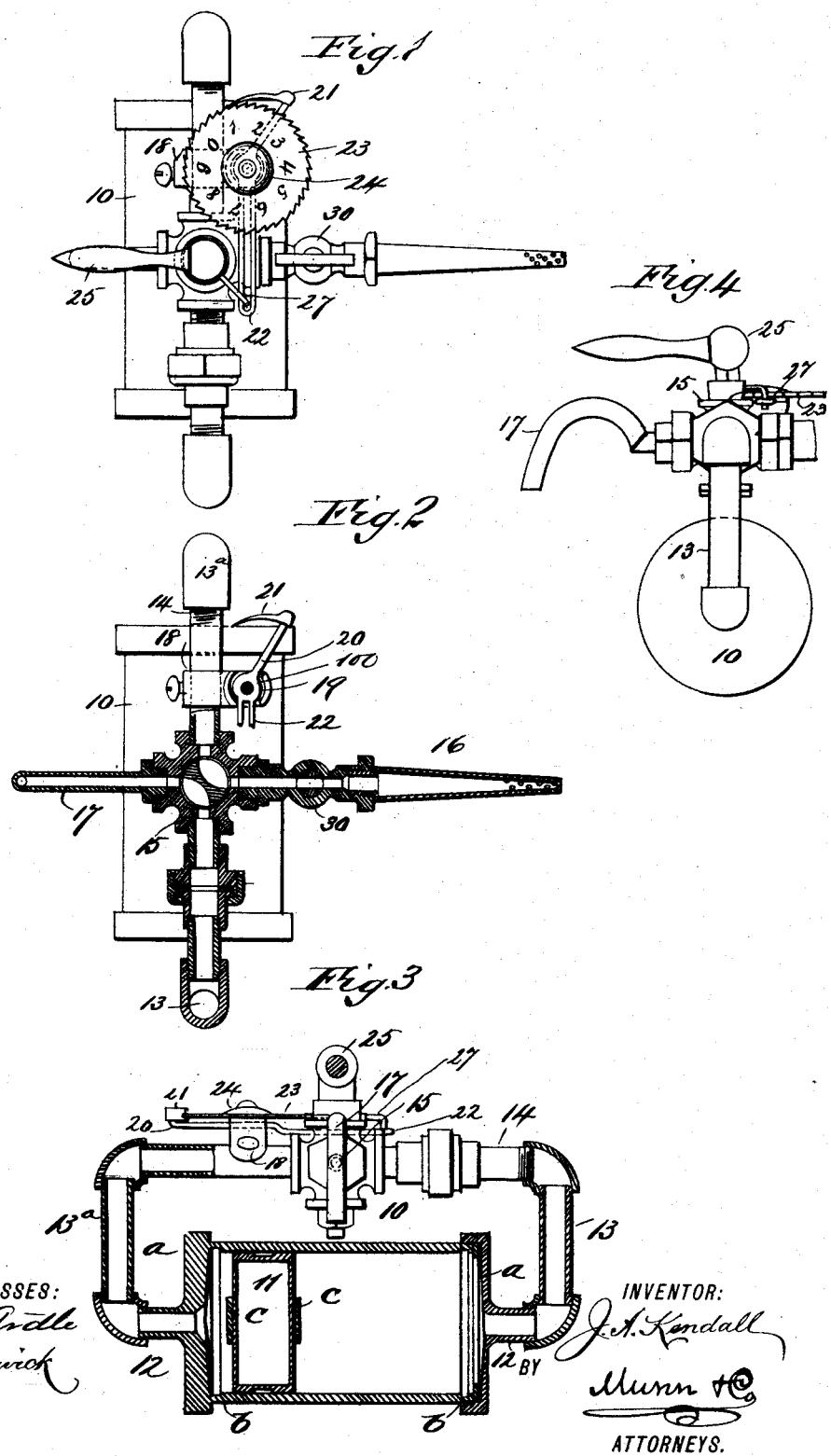
WITNESSES:
F. McArdle
C. Sedgwick
INVENTOR:
J. A. Kendall
BY
Munn & Co.
ATTORNEYS.

UNITED STATES PATENT OFFICE.

JOHN A. KENDALL, OF MAYSVILLE, MISSOURI.

MEASURING-FAUCET.

SPECIFICATION forming part of Letters Patent No. 419,778, dated January 21, 1890.

Application filed May 3, 1889. Serial No. 309,501. (No model.)

*To all whom it may concern:*

Be it known that I, JOHN A. KENDALL, of Maysville, in the county of De Kalb and State of Missouri, have invented a new and Improved Measuring-Faucet, of which the following is a full, clear, and exact description.

This invention relates to measuring-faucets, the object of the invention being to provide a faucet by means of which the quantity of liquid withdrawn from a cask or receptacle may be accurately measured.

To the end named the invention consists in the construction and arrangement of parts, as will be hereinafter fully explained, and specifically pointed out in the claim.

Reference is to be had to the accompanying drawings, forming a part of this specification, in which similar figures and letters of reference indicate corresponding parts in all the views.

Figure 1 is a plan view of my improved measuring-faucet. Fig. 2 is a sectional plan view of the same. Fig. 3 is a face view in which the cylinder, piston, and a portion of the piping are shown in section; and Fig. 4 is an end view of the faucet.

In the drawings, 10 represents a cylinder within which there is mounted a piston or plunger 11. The inner faces of the cylinder caps or heads are inclined slightly, as shown at $a$, and just within the cylinder caps or heads there are formed grooves $b$, which catch any débris which may enter the cylinder. Upon the piston I secure central disks or projections $c$, which, when the piston is reciprocated, act as stops.

Each of the cylinder-heads is provided with an outwardly-extending tube 12, and to these tubes there are connected pipes 13 and 13ª, which in turn are coupled to a horizontal pipe 14, that is provided with a four-way cock 15, the cock-chamber being in communication with the inlet-shank 16, and with a discharge-nozzle 17, said discharge-nozzle extending upward and then downward, as shown in Fig. 4.

To the tube or pipe 14, I clamp a bracket 18, which supports a shaft 19, upon which there is mounted a double-armed lever 100, the arm 20 of said lever carrying a spring-pawl 21, while the other lever-arm, which is shown at 22, is centrally slotted. The shaft 19 also carries a toothed disk 23, which is held to place by a spring-disk 24. The handle 25 of the four-way cock 15 is provided with a stem or arm 27, that enters the slot of the lever-arm 22. In order that the passage from the inlet-shank 16 may be closed, I provide a stop-cock 30, that is located as shown.

In operation the cock 15 is turned so as to permit the flow of liquid from the inlet-shank through one of the pipes 13 or 13ª, and I will suppose that the cock is turned, so as to admit the flow through the pipe 13ª. Then as the liquid enters the cylinder 10 the piston or plunger will be forced forward toward the pipe 13, and any liquid in advance will be forced through the pipe 13 and through the second passage of the four-way cock into the discharge-nozzle 17. Then the cock is reversed, so as to establish communication between the inlet-shank and the pipe 13, and the liquid which had just entered the cylinder through the pipe 13ª will be forced back through said pipe 13ª into the nozzle 17, and as the handle of the four-way cock is turned, as just above set forth, the lever-arm 22 will be thrown first outward and then inward and the arm 20 carried forward and backward, which movement of the arm 20 will bring the spring-pawl 21 into engagement with the teeth of the disk 23, and said disk will be advanced one step for each throw of the four-way-cock handle. In this way an accurate record of the liquid drawn from the reservoir or receptacle will be kept.

Having thus described my invention, I claim as new and desire to secure by Letters Patent—

In a measuring-faucet, the combination, with a cylinder, of a piston mounted therein, tubes which lead to the cylinder ends, a four-way cock arranged in connection with the tubes, an inlet-shank which communicates with the chamber of the four-way cock, a discharge-nozzle also communicating with the chamber of the four-way cock, a toothed disk 23, a lever formed with arms 20 and 22, the latter having a longitudinal slot, a spring-pressed pawl carried by the arm 20 and arranged to engage a toothed indicator-disk, and an angular arm 27, secured to the four-way-cock stem and entering the slot to work said lever in opposite directions, substantially as set forth.

JOHN A. KENDALL.

Witnesses:
F. B. MILLER,
W. C. ROBERTS.